(12) United States Patent
Matsugi

(10) Patent No.: US 11,732,977 B2
(45) Date of Patent: Aug. 22, 2023

(54) TOTAL HEAT EXCHANGE ELEMENT AND METHOD FOR MANUFACTURING SAME

(71) Applicant: DAIKIN INDUSTRIES, LTD., Osaka (JP)

(72) Inventor: Yoshitaka Matsugi, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 17/152,511

(22) Filed: Jan. 19, 2021

(65) Prior Publication Data

US 2021/0140723 A1 May 13, 2021

Related U.S. Application Data

(63) Continuation of application No. PCT/JP2019/027162, filed on Jul. 9, 2019.

(30) Foreign Application Priority Data

Jul. 23, 2018 (JP) .................... 2018-137388

(51) Int. Cl.
*F28F 3/08* (2006.01)
*F24F 7/08* (2006.01)
(Continued)

(52) U.S. Cl.
CPC ............... *F28F 3/08* (2013.01); *F24F 7/08* (2013.01); *F28D 9/02* (2013.01); *F28F 21/00* (2013.01); *F28F 2275/025* (2013.01)

(58) Field of Classification Search
CPC ........ F28F 3/08; F28F 21/00; F28F 2275/025; F28F 12/006; F24F 7/08; F28D 9/02; F28D 9/0062

See application file for complete search history.

(56) References Cited

U.S. PATENT DOCUMENTS

| 9,962,459 | B2 * | 5/2018 | Zhang | ............ A61L 15/60 |
| 2009/0298976 | A1 * | 12/2009 | Yano | ............ C08L 1/02 |
| | | | | 524/35 |

(Continued)

FOREIGN PATENT DOCUMENTS

| JP | 57-70392 A | 4/1982 |
| JP | 60-259897 A | 12/1985 |

(Continued)

OTHER PUBLICATIONS

International Preliminary Report of corresponding PCT Application No. PCT/JP2019/027162 dated Feb. 4, 2021.

(Continued)

*Primary Examiner* — Paul Alvare
(74) *Attorney, Agent, or Firm* — Global IP Counselors, LLP

(57) ABSTRACT

A total heat exchange element includes a plurality of partition members made of a material that contains cellulose as a main component, a spacing member made of a material that contains cellulose as a main component, and an adhesive portion bonding the partition members and the spacing member together. The partition members are configured as flat sheets, and are stacked with a predetermined distance between them. The spacing member is disposed between adjacent ones of the stacked partition members to maintain the distance between them. The total heat exchange element has a first air flow path and a second air flow path alternately formed with one of the partition members interposed between the first and second air flow paths. The adhesive portion contains, as an adhesive component, cellulose having a smaller diameter than both of the cellulose forming the partition members and the cellulose forming the spacing member.

5 Claims, 8 Drawing Sheets

(51) Int. Cl.
*F28D 9/02* (2006.01)
*F28F 21/00* (2006.01)

(56) References Cited

U.S. PATENT DOCUMENTS

| | | |
|---|---|---|
| 2010/0175859 A1 | 7/2010 | Takada et al. |
| 2016/0252269 A1* | 9/2016 | Takeda .................. D21H 27/40 |
| | | 165/166 |
| 2017/0030657 A1* | 2/2017 | Omori .................... D21H 27/40 |
| 2018/0043303 A1* | 2/2018 | Gebald .................... B01J 20/32 |
| 2020/0000044 A1 | 1/2020 | Salou et al. |
| 2021/0108110 A1* | 4/2021 | Backfolk ................ B32B 29/08 |

FOREIGN PATENT DOCUMENTS

| | | |
|---|---|---|
| JP | 8-219676 A | 8/1996 |
| JP | WO2009/004695 A1 | 1/2009 |
| JP | 2011-237157 A | 11/2011 |
| JP | 2015-178199 A | 10/2015 |
| JP | 2017-150802 A | 8/2017 |
| WO | 2018/146387 A1 | 8/2018 |

OTHER PUBLICATIONS

International Search Report of corresponding PCT Application No. PCT/JP2019/027162 dated Oct. 1, 2019.
Written Opinion of the International Searching Authority corresponding PCT Application No. PCT/JP2019/027162 dated Oct. 1, 2019.

\* cited by examiner

TOTAL HEAT EXCHANGE ELEMENT AND METHOD FOR MANUFACTURING SAME

CROSS-REFERENCE TO RELATED APPLICATIONS

This is a continuation of International Application No. PCT/JP2019/027162 filed on Jul. 9, 2019, which claims priority to Japanese Patent Application No. 2018-137388 filed on Jul. 23, 2018. The entire disclosures of these applications are incorporated by reference herein.

BACKGROUND

Field of Invention

The present disclosure relates to a total heat exchange element and a method for manufacturing the same.

Background Information

WO 2009/004695 discloses a total heat exchange element for use in a ventilation apparatus. This total heat exchange element is a cross-flow heat exchanger that exchanges sensible heat and moisture (latent heat) between outdoor air to be supplied into a room and room air to be exhausted out of the room.

The total heat exchange element includes a plurality of partition members configured as flat sheets, and a plurality of spacing members configured as corrugated sheets. The partition members and the spacing members are alternately stacked one over another. The material of the partition members and the spacing members is paper containing cellulose as a main component. The total heat exchange element has rows of a plurality of supply air passages and rows of a plurality of exhaust air passages. These rows are alternately formed with the partition members each interposed between the associated adjacent rows.

SUMMARY

A first aspect of the present disclosure is directed to a total heat exchange element including: a plurality of partition members made of a material that contains cellulose as a main component, and configured as flat sheets, the partition members being stacked with a predetermined distance therebetween; a spacing member made of a material that contains cellulose as a main component, and disposed between adjacent ones of the stacked partition members to maintain the distance therebetween; and an adhesive portion bonding the partition members and the spacing member together. The total heat exchange element has a first air flow path and a second air flow path, which are alternately formed with one of the partition members interposed between the first and second air flow paths. The adhesive portion contains, as an adhesive component, cellulose having a smaller diameter than both of the cellulose forming the partition members and the cellulose forming the spacing member.

DETAILED DESCRIPTION OF EMBODIMENT(S)

A total heat exchange element (30) according to an embodiment will be described.

Ventilation Apparatus

The total heat exchange element (30) according to this embodiment is provided for a ventilation apparatus (10). The ventilation apparatus (10) including the total heat exchange element (30) will now be described.

Figure 1:
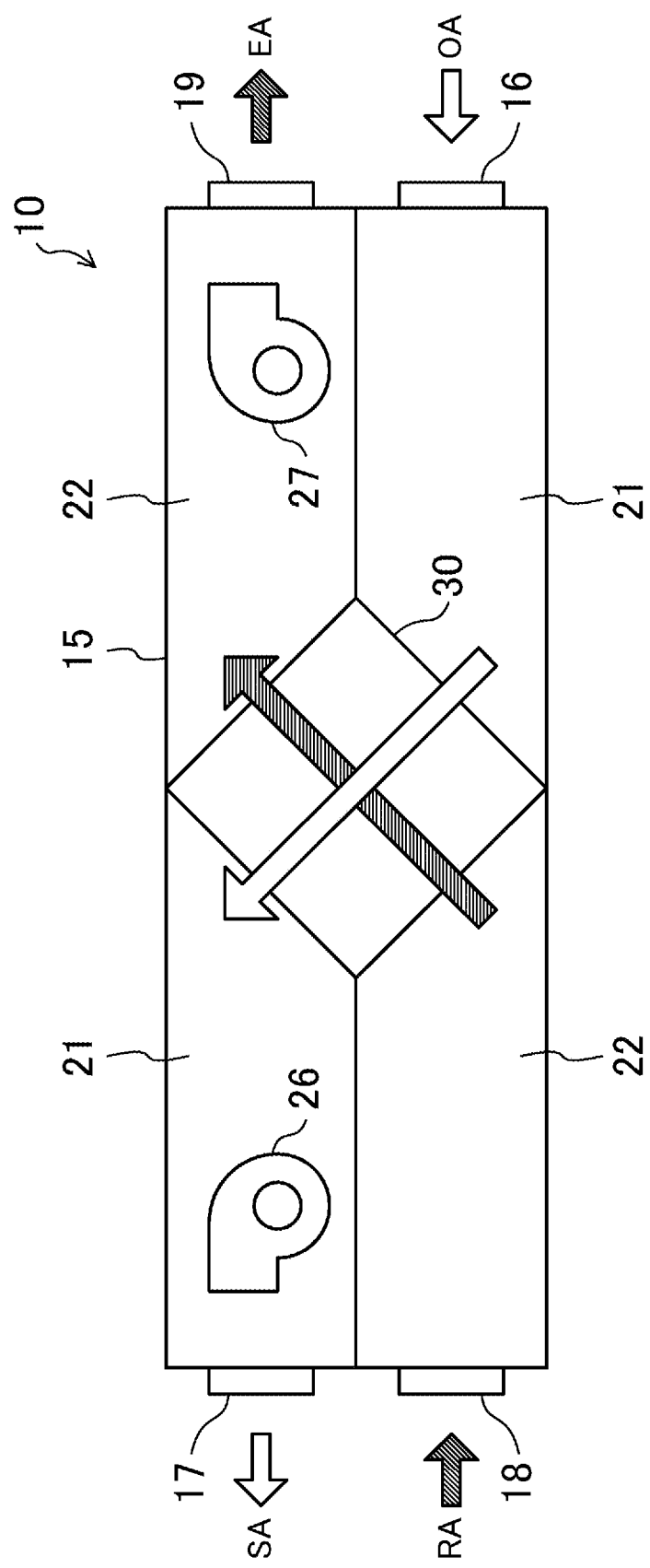
FIG. 1 is a schematic diagram illustrating a ventilation apparatus including a total heat exchange element according to an embodiment.

As illustrated in FIG. 1, the ventilation apparatus (10) includes a casing (15) housing the total heat exchange element (30). The casing (15) includes an outdoor air inlet (16), an air supply port (17), a room air inlet (18), and an exhaust port (19). In the internal space of the casing (15), an air supply passage (21) and an exhaust passage (22) are formed. The air supply passage (21) has two ends respectively connected to the outdoor air inlet (16) and the air supply port (17). The exhaust passage (22) has two ends respectively connected to the room air inlet (18) and the exhaust port (19).

The total heat exchange element (30) is positioned to intersect the air supply passage (21) and the exhaust passage (22). The total heat exchange element (30) is disposed in the casing (15) such that a plurality of first air flow paths (36) described below communicate with the air supply passage (21), and a plurality of second air flow paths (37) described below communicate with the exhaust passage (22). The total heat exchange element (30) will be described in detail later.

The ventilation apparatus (10) further includes an air supply fan (26) and an exhaust fan (27). The air supply fan (26) is disposed downstream of the total heat exchange element (30) in the air supply passage (21) (i.e., near the air supply port (17)). The exhaust fan (27) is disposed downstream of the total heat exchange element (30) in the exhaust passage (22) (i.e., near the exhaust port (19)).

In the ventilation apparatus (10), outdoor air flows through the air supply passage (21) toward the room, and room air flows through the exhaust passage (22) toward the outside of the room. The total heat exchange element (30) exchanges sensible heat and moisture (latent heat) between the outdoor air flowing through the air supply passage (21) and the room air flowing through the exhaust passage (22).

Total Heat Exchange Element

Figure 2:
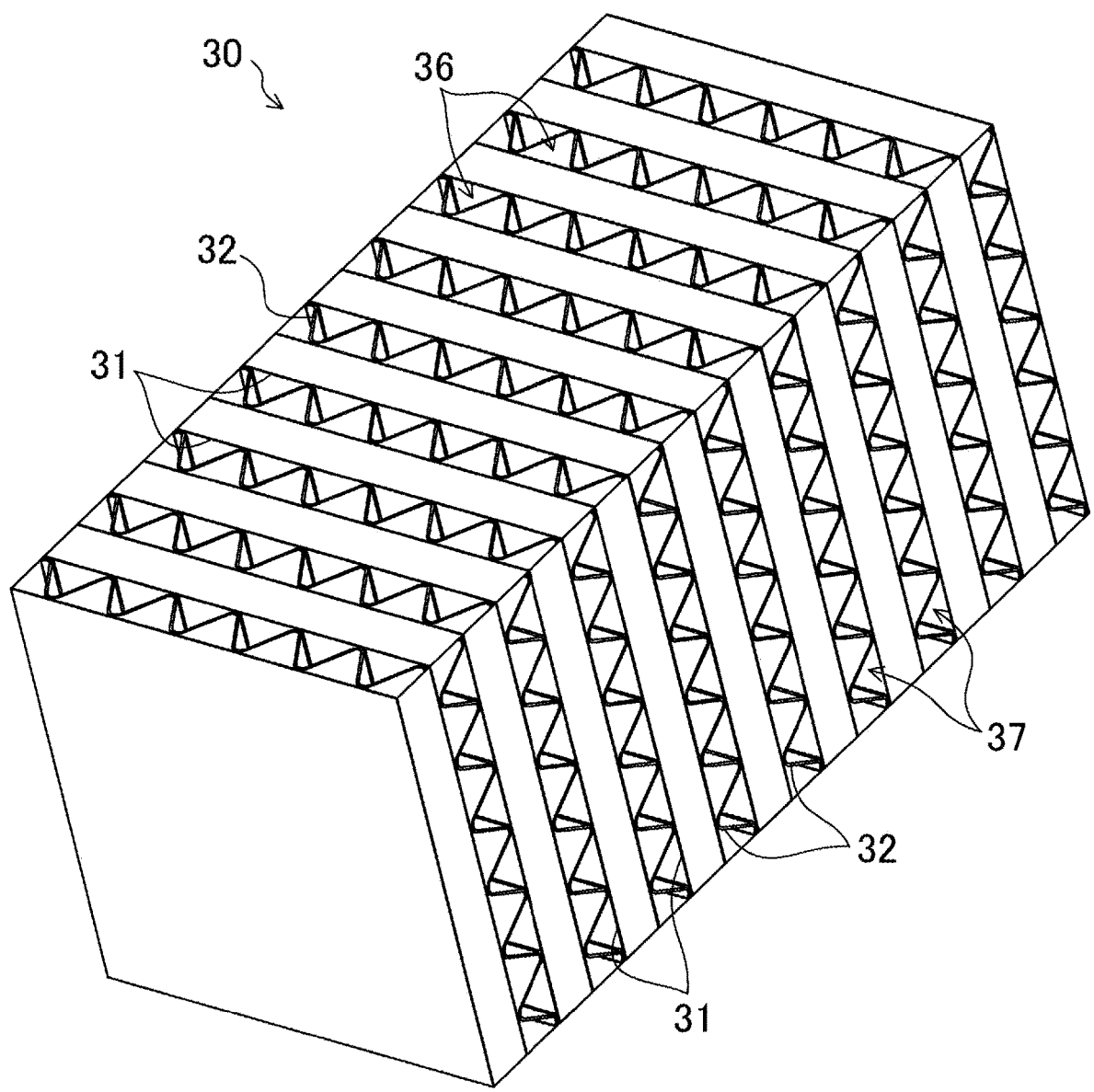
FIG. 2 is a schematic perspective view illustrating the total heat exchange element according to the embodiment.

As illustrated in FIG. 2, the total heat exchange element (30) is a cross-flow heat exchanger having rows of the first air flow paths (36) and rows of the second air flow paths (37). The total heat exchange element (30) includes a plurality of partition members (31) and a plurality of spacing members (32). The partition members (31) and the spacing members (32) are alternately stacked one over another to form a quadrangular prism as a whole. In the total heat exchange element (30), the distances between adjacent ones of the partition members (31) are substantially kept constant by the associated spacing members (32).

The partition members (31) are configured as flat sheets that are generally square in plan view. The material of the partition members (31) is paper or a nonwoven fabric containing cellulose as a main component. The partition members (31) have a thickness t1 of generally about 30 μm. The partition members (31), which are made of paper or a non-woven fabric containing cellulose as the main component, are permeable to moisture.

The spacing members (32) are configured as corrugated sheets that are generally square in plan view. The spacing members (32) each have a plurality of ridges (32a) and a plurality of valleys (32b). The crest lines of these ridges (32a) and the bottom lines of these valleys (32b) are linear. The crest lines of the ridges (32a) and the bottom lines of the valleys (32b) are substantially parallel to one another. The ridges (32a) and valleys (32b) of each of the spacing members (32) are alternately formed. The spacing members (32) each maintain the distance between two of the partition members (31) arranged on both sides thereof.

The material of the spacing members (32) is paper or a nonwoven fabric containing cellulose as a main component. The spacing members (32) have a thickness t2 of generally about 60 μm. The spacing members (32), which are made of paper or a non-woven fabric containing cellulose as the main component, are capable of retaining moisture.

In the total heat exchange element (30), the rows of the first air flow paths (36) and the rows of the second air flow paths (37) are alternately formed in the direction in which the partition members (31) and the spacing members (32) are stacked (i.e., the direction of the center axis of the total heat exchange element (30)). Adjacent ones of the rows of the first and second air flow paths (36, 37) are separated from one another by the associated partition members (31).

In the total heat exchange element (30), the spacing members (32) adjacent to each other with the associated partition member (31) interposed therebetween are disposed such that the directions of the crest lines of the corrugations of the adjacent spacing members (32) are substantially orthogonal to each other. As a result, in the total heat exchange element (30), the rows of the first air flow paths (36) open through a pair of opposed side surfaces of the total heat exchange element (30), and the rows of the second air flow paths (37) open through a pair of the other opposed side surfaces thereof.

Figure 3:
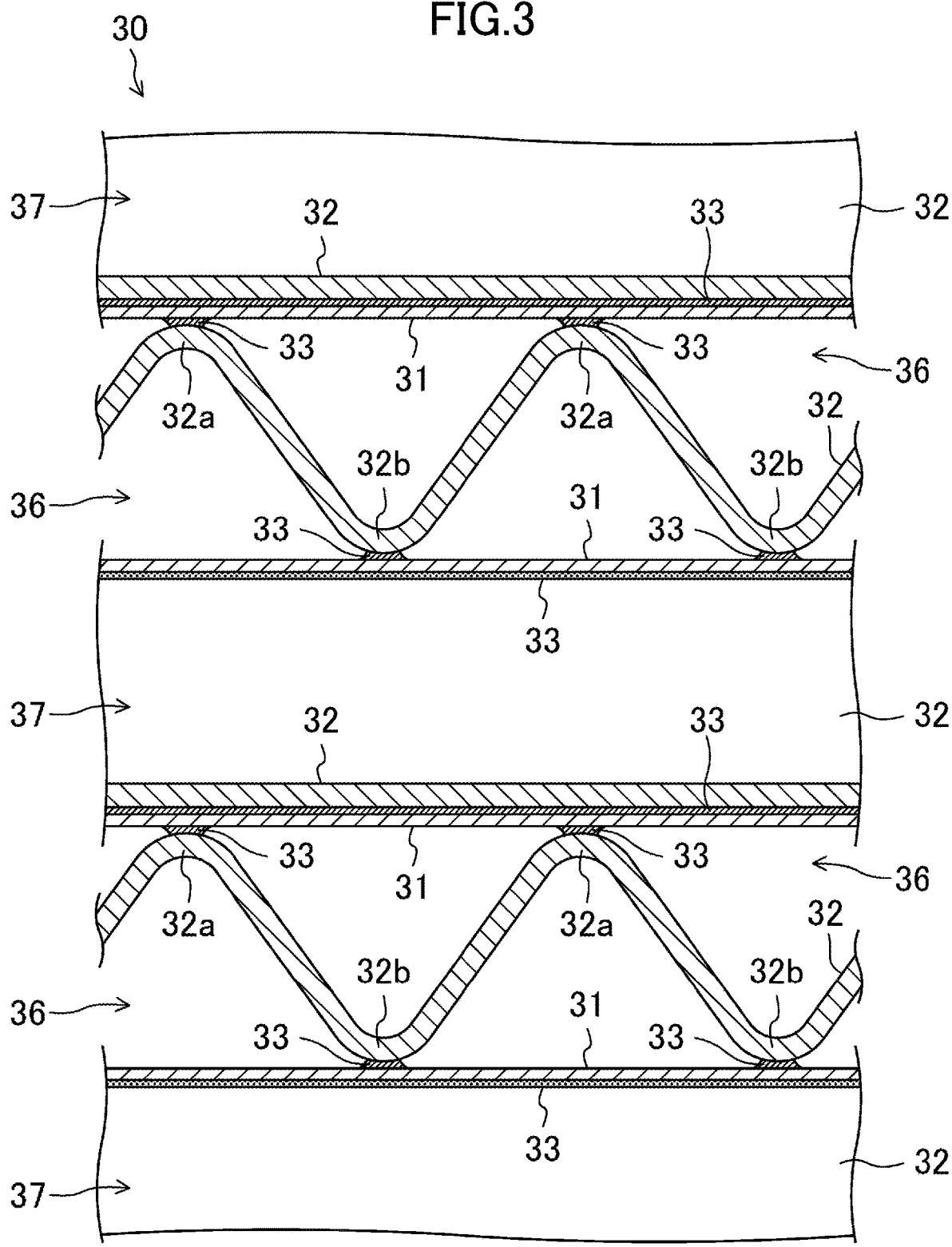
FIG. 3 is a cross-sectional view illustrating an essential portion of the total heat exchange element according to the embodiment.

As illustrated in FIG. 3, in the total heat exchange element (30), adjacent ones of the partition members (31) and the spacing members (32) are joined together with adhesive layers (33) constituting adhesive portions. The adhesive layers (33) are positioned near the apexes of the ridges (32a) and the bottoms of the valleys (32b) of the associated spacing members (32). Further, the adhesive layers (33) are each formed across the length of an associated one of the ridges (32a) and valleys (32b). The adhesive layers (33) are each formed through drying of an adhesive (34) containing cellulose as an adhesive component. The main component of each adhesive layer (33) is cellulose.

The adhesive layers (33) contain cellulose, which is hydrogen-bonded to cellulose forming the partition members (31), and are thus joined to the associated partition members (31). The adhesive layers (33) contain cellulose, which is hydrogen-bonded to cellulose forming the spacing members (32), and are thus joined to the associated spacing members (32).

The cellulose forming the partition members (31) and the spacing members (32) has a diameter of generally about 2 μm and a length generally ranging from about 500 μm to about 5000 μm. On the other hand, the cellulose forming the adhesive layers (33) is configured as so-called cellulose nanofibers, which each have a diameter generally ranging from about 2 nm to about 10 nm and a length generally ranging from about 10 nm to about 1000 nm.

As can be seen, the cellulose forming the adhesive layers (33) has a much smaller diameter than the cellulose forming the partition members (31) and the spacing members (32). Thus, more hydrogen bonds occur between the cellulose forming the adhesive layers (33) and the cellulose forming the partition members (31) and the spacing members (32) than if the cellulose forming the adhesive layers (33) and the cellulose forming the partition members (31) and the spacing members (32) have substantially the same diameter. As a result, the adhesive layers (33) are firmly joined to the associated partition members (31) and the associated spacing members (32).

The main component of the adhesive layers (33) and the main components of the partition members (31) and the spacing members (32) are all cellulose. Thus, the adhesive layers have moisture permeability that is substantially equivalent to that of the partition members (31) and the spacing members (32).

Method for Manufacturing Total Heat Exchange Element

A method for manufacturing a total heat exchange element (30) will be described.

Figure 4:
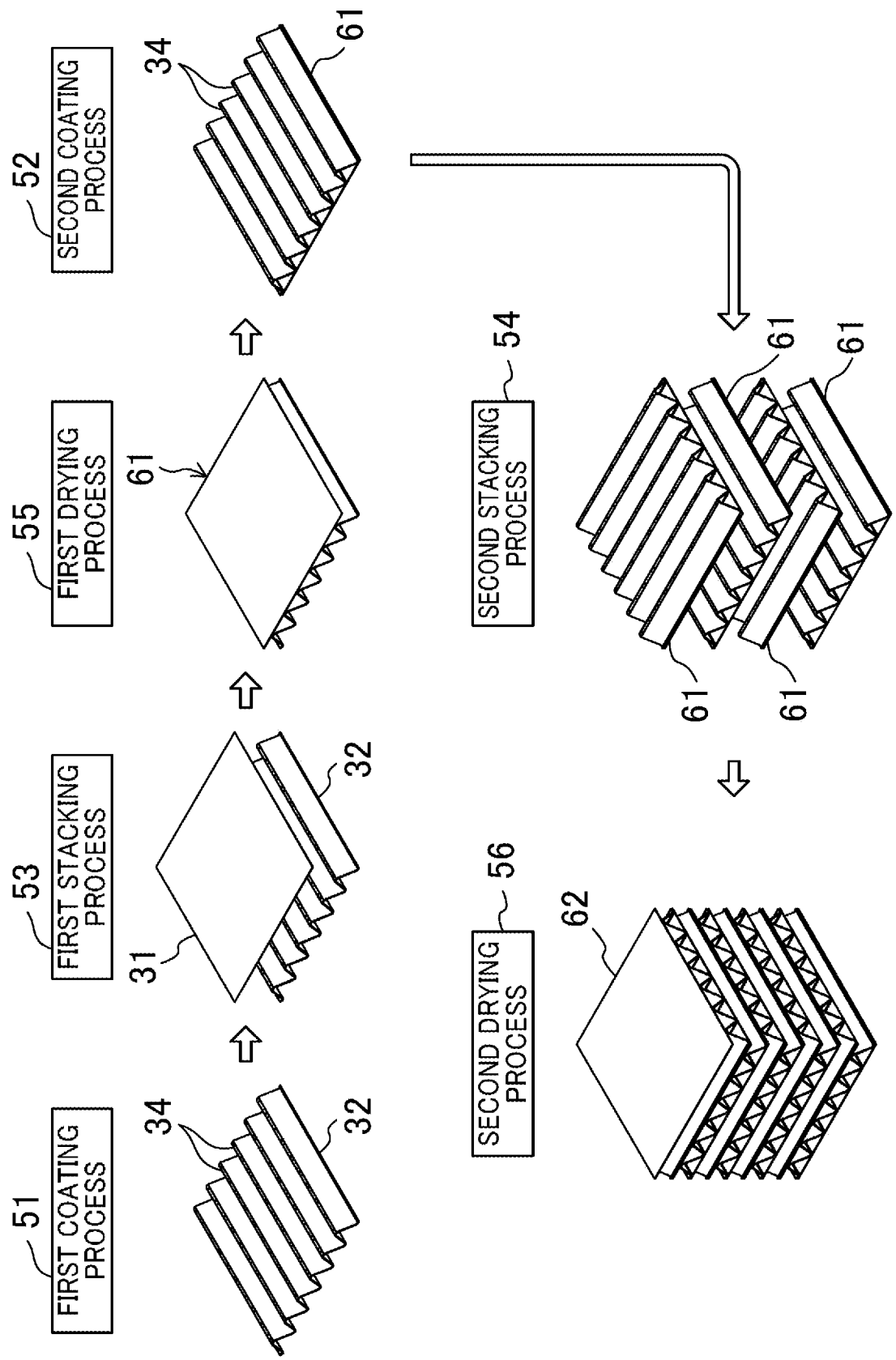
FIG. 4 is a process chart showing a method for manufacturing a total heat exchange element according to the embodiment.

As illustrated in FIG. 4, the method for manufacturing the total heat exchange element (30) includes a first coating process (51), a first stacking process (53), a first drying process (55), a second coating process (52), a second stacking process (54), and a second drying step (56), which are performed in this order.

Figure 5:
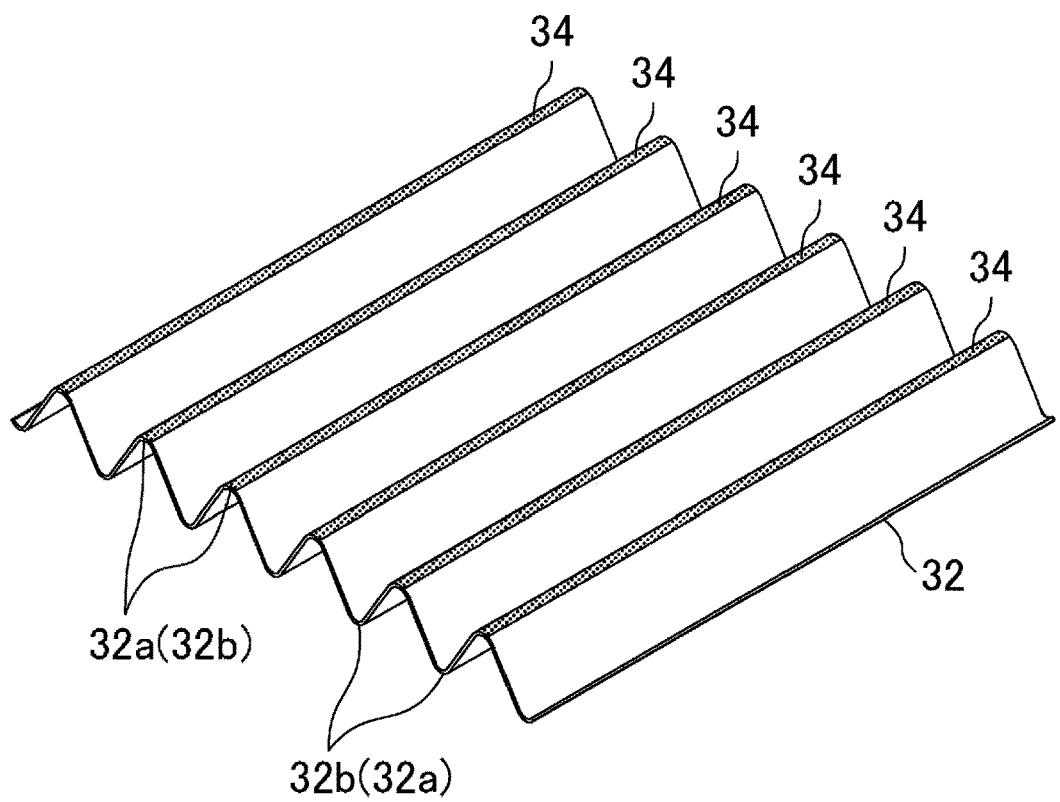
FIG. 5 is a schematic perspective view illustrating a spacing member that has undergone a first coating process.

In the first coating process (51), a spacing member (32) is coated with an adhesive (34). As illustrated in FIG. 5, either the apexes of ridges (32a) or the bottoms of valleys (32b) of the spacing member (32) that has undergone the first coating process (51) are coated with the adhesive (34).

The adhesive (34) for use in the first coating process (51) is a suspension that contains water serving as a dispersion medium, and cellulose serving as an adhesive component and dispersed in the water. In one preferred embodiment, the adhesive (34) has a viscosity generally ranging from about 50 mPa·s to about 2000 mPa·s. Further, the adhesive (34) may contain an addition agent, such as a thickener.

Figure 6:
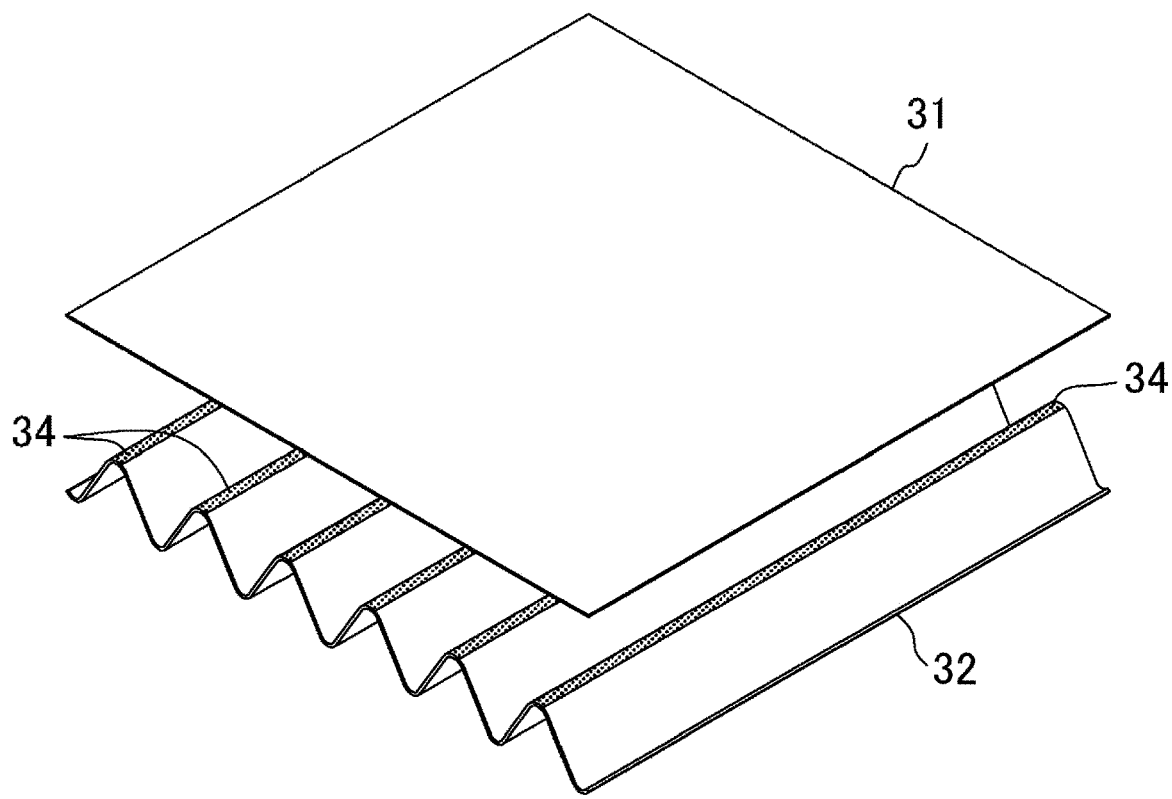
FIG. 6 is a schematic perspective view illustrating the spacing member and a partition member, which are stacked in a first stacking process.

In the first stacking process (53), a partition member (31) is placed over the spacing member (32) that has been coated with the adhesive (34) in the first coating process (51). As illustrated in FIG. 6, in the first stacking process (53), the partition member (31) is disposed so as to be in contact with the adhesive (34) with which the spacing member (32) has been coated. In the first stacking process (53), the partition member (31) and the spacing member (32) are placed one over the other to form a first semi-finished product (61).

In the first drying process (55), the first semi-finished product (61) formed in the first stacking process (53) is dried. In this first drying process (55), the first semi-finished product (61) is heated to evaporate the dispersion medium contained in the adhesive (34). The evaporated dispersion medium of the adhesive (34) causes hydrogen bonds between the cellulose contained in the adhesive (34) and cellulose forming the partition member (31) and the spacing member (32). As a result, adhesive layers (33) are formed, and allow the partition member (31) and the spacing member (32) to be joined together.

Figure 7:
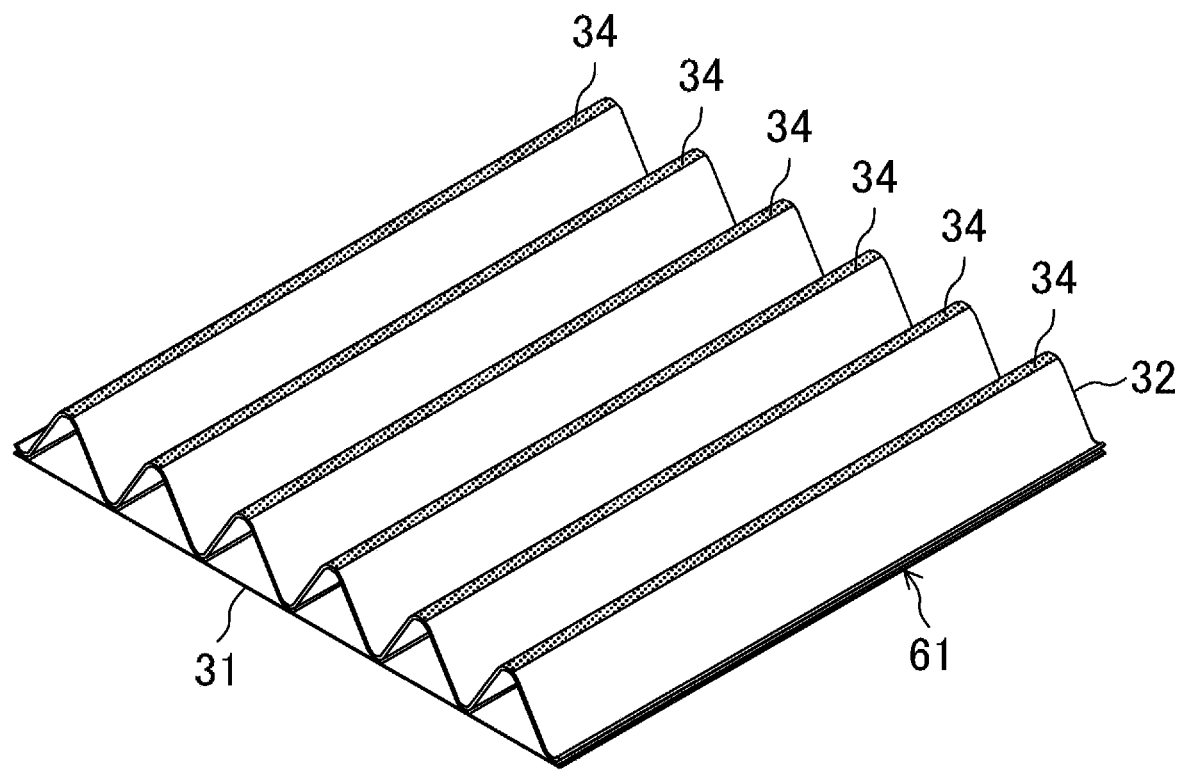
FIG. 7 is a schematic perspective view illustrating a first semi-finished product that has undergone a second coating process.

In the second coating process (52), the spacing member (32) of the first semi-finished product (61) that has undergone the first drying process (55) is coated with the adhesive (34). As illustrated in FIG. 7, in the second coating process (52), either the apexes of the ridges (32a) or the bottoms of the valleys (32b) of the spacing member (32) that are not joined to the partition member (31) are coated with the adhesive (34). The adhesive (34) for use in the second coating process (52) is identical to the adhesive (34) for use in the first coating process (51).

Figure 8:
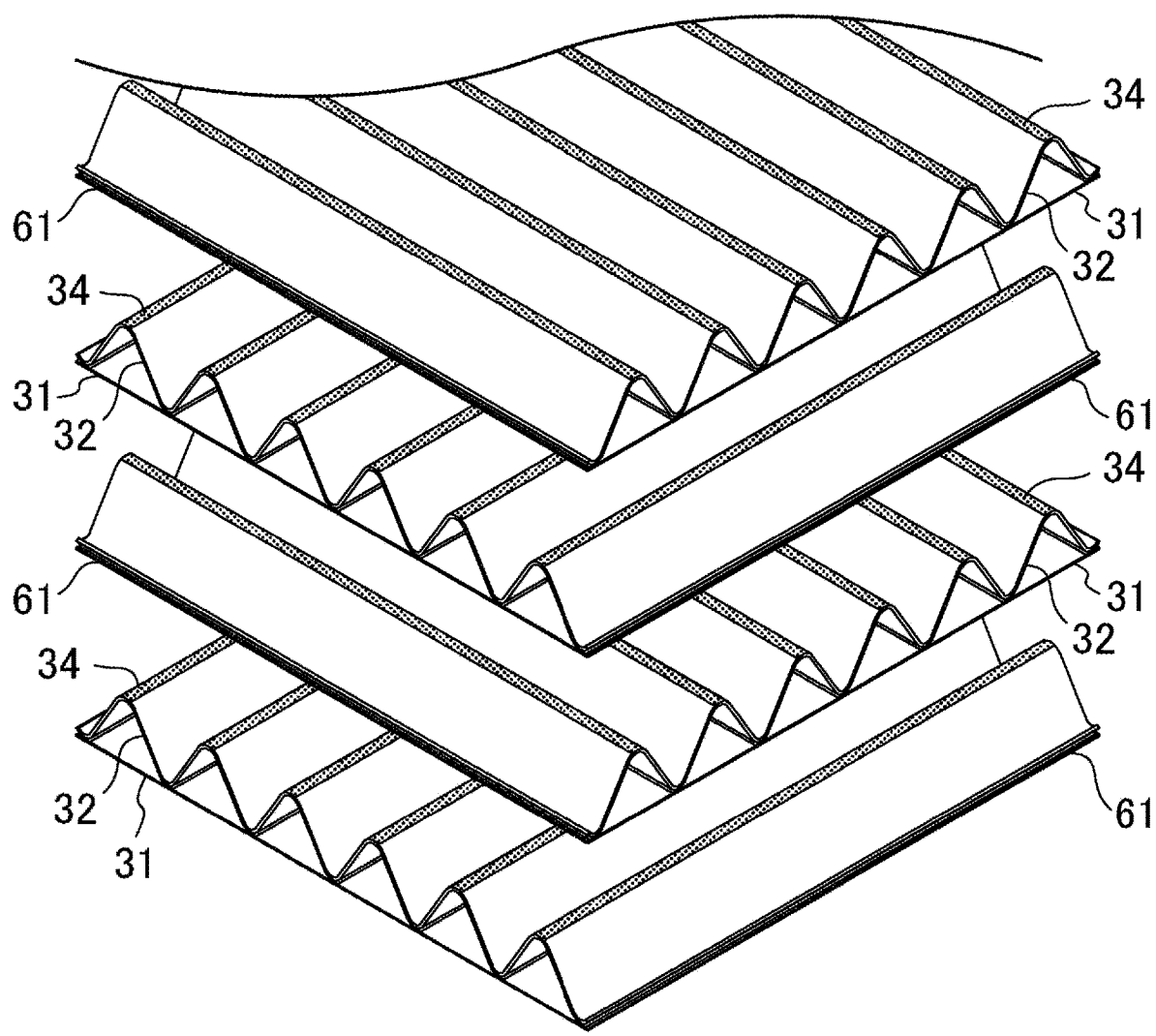
FIG. 8 is a schematic perspective view illustrating a plurality of first half-finished products, which are stacked in a second stacking process.
Figure 9:
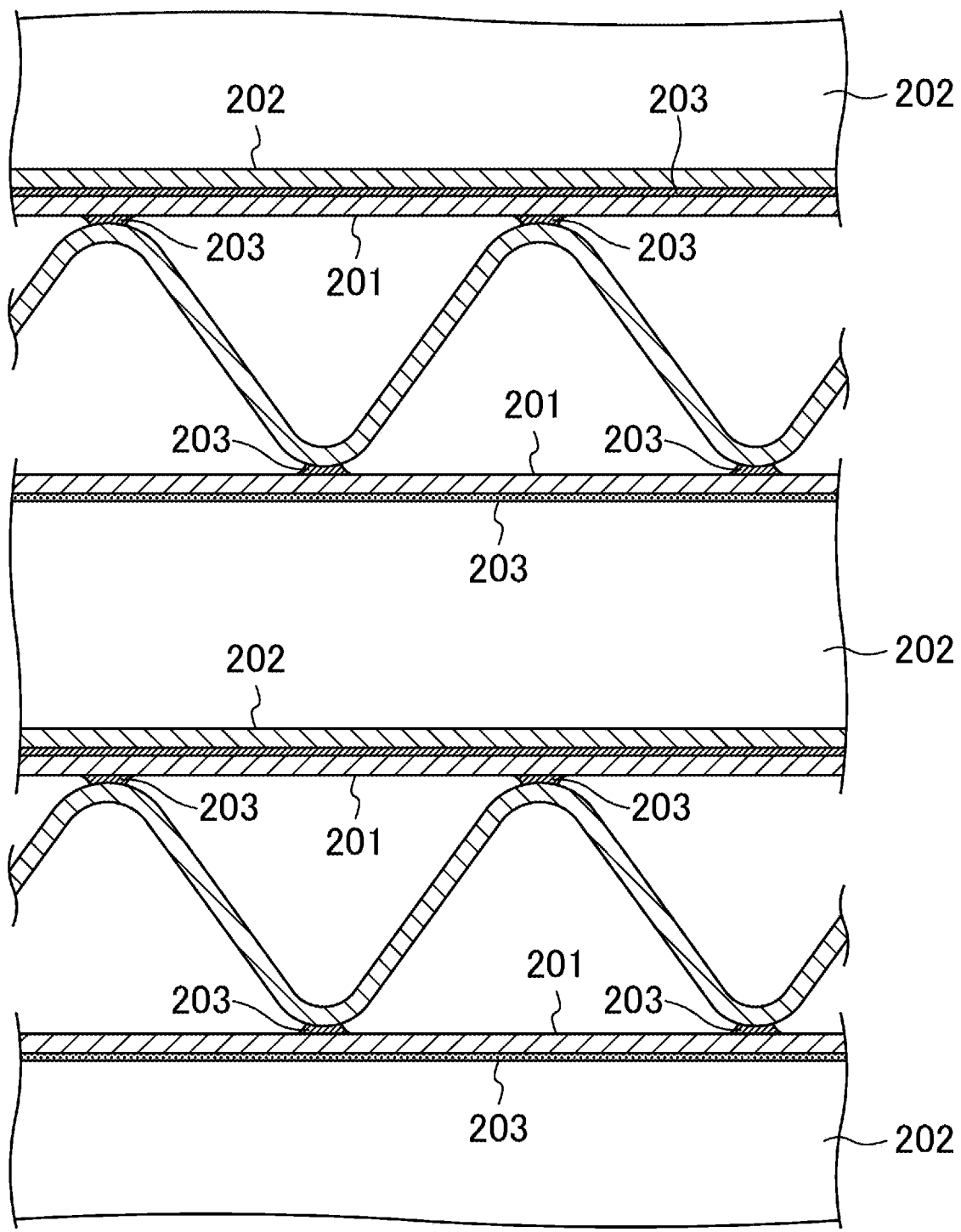
FIG. 9 is a cross-sectional view illustrating an essential portion of a known total heat exchange element.

In the second stacking process (54), a plurality of first semi-finished products (61) that have undergone the second coating process (52) are placed one over another. As illustrated in FIG. 8, in the second stacking process (54), the partition member (31) of each of the first semi-finished products (61) is disposed so as to be in contact with the adhesive (34) with which the spacing member (32) of an adjacent one of the first semi-finished products (61) has been coated. In the second stacking step (54), a second semi-finished product (62) including the stacked first semi-finished products (61) is formed.

In the second drying process, the second semi-finished product (62) formed in the second stacking process (54) is dried. In this second drying process (56), the second semi-finished product (62) is heated to evaporate the dispersion medium contained in the adhesive (34). The evaporated dispersion medium of the adhesive (34) causes hydrogen bonds between the cellulose contained in the adhesive (34) and cellulose forming the partition members (31) and the spacing members (32). As a result, adhesive layers (33) are formed, and allow the partition members (31) and the spacing members (32) to be joined together.

Then, a finishing process in which a necessary member, such as a frame, is attached to the second semi-finished product (62) that has undergone the second drying process (56) is undergone. As a result, the total heat exchange element (30) that is a final product is completed.

Feature (1) of Embodiment

The total heat exchange element (30) of this embodiment includes the partition members (31), the spacing members (32), and the adhesive layers (33). The partition members (31) are made of a material containing cellulose as a main component, are configured as flat sheets, and are stacked with a predetermined distance therebetween. The spacing members (32) are made of a material containing cellulose as a main component, and are each disposed between associated adjacent ones of the stacked partition members (31) to maintain the distance therebetween. The adhesive layers (33) bond the partition members (31) and the spacing members (32) together. In the total heat exchange element (30), the rows of the first air flow paths (36) and the rows of the second air flow paths (37) are alternately formed with each of the partition members (31) interposed between associated adjacent ones of the rows of the first and second air flow paths (36, 37). The adhesive layers (33) contain, as an adhesive component, cellulose having a smaller diameter than both of the cellulose forming the partition members (31) and the cellulose forming the spacing members (32).

The cellulose contained as the adhesive component in the adhesive layers (33) of the total heat exchange element (30) of this embodiment is joined to the partition members (31) and the spacing members (32). The cellulose contained as the adhesive component in the adhesive layers (33) has a smaller diameter than the cellulose forming the partition members (31) and the spacing members (32). This increases the bonding strength of the adhesive layers (33) to the partition members (31) and the spacing members (32). The adhesive component of the adhesive layers (33) and the main component of the material of the partition members (31) and the spacing members (32) are both cellulose. Thus, the adhesive layers (33) have relatively high moisture permeability just like the partition members (31).

The difference in moisture permeability between portions of each partition member (31) of the total heat exchange element (30) of this embodiment coated with the adhesive layers (33) and the other portions that are not coated with the adhesive layers (33) is less than in the known art. Thus, according to this embodiment, the entire partition members (31) are effectively used to allow moisture to be transferred between air flowing through the first air flow paths (36) and air flowing through the second air flow paths (37). This can improve the performance of the total heat exchange element (30).

Here, the total heat exchange element (30) has its spacing elements (32) each disposed inside an associated one of the rows of the air flow paths (36, 37). The spacing members (32) each retain moisture contained in the air flowing through the associated row of the air flow paths (36, 37). Adhesive layers (203) of a known total heat exchange element (200) located between associated adjacent ones of spacing members (202) and partition members (201) have low moisture permeability. Thus, the adhesive layers (203) block moisture from moving from the spacing members (202) to the partition members (201).

To address this problem, the adhesive component of each adhesive layer (33) of the total heat exchange element (30) of this embodiment is cellulose. As described above, the adhesive layers (33) of this embodiment have relatively high moisture permeability just like the partition members (31). For this reason, the moisture retained by the spacing members (32) of the total heat exchange element (30) of this embodiment moves to the partition members (31) without being blocked by the adhesive layers (33). Thus, according to this embodiment, the moisture retained by the spacing members (32) can be moved to the partition members (31) so as to be imparted to air flowing through the air flow paths (36, 37). This can improve the performance of the total heat exchange element (30).

Feature (2) of Embodiment

In the total heat exchange element (30) of this embodiment, the cellulose serving as the adhesive component of the adhesive layers (33) has a diameter ranging from 2 nm to 100 nm. The adhesive layers (33) contain cellulose having a diameter in a predetermined range as the adhesive component. The cellulose contained as the adhesive component in the adhesive layers (33) is configured as so-called cellulose nanofibers.

Feature (3) of Embodiment

The spacing members (32) of the total heat exchange element (30) of this embodiment are configured as corrugated sheets each having a greater thickness than the partition members (31). In other words, each of the spacing members (32) configured as corrugated sheets has a greater thickness than each of the partition members (31) configured as flat sheets.

According to this embodiment, a sufficient amount of moisture can be retained by the spacing members (32). This can increase the amount of moisture moving from the spacing members (32) to the partition members (31) so as to be imparted to air flowing through the air flow paths (36, 37). This can improve the performance of the total heat exchange element (30).

Feature (4) of Embodiment

The manufacturing method according to this embodiment is a method for manufacturing a total heat exchange element (30) including partition members (31) made of a material that contains cellulose as the main component and configured as flat sheets, and spacing members (32) made of a material that contains cellulose as the main component. The partition members (31) and the spacing members (32) are alternately stacked one over another. The total heat exchange element (30) has rows of first air flow paths (36) and rows of second air flow paths (37), which are alternately formed with each of the partition members (31) interposed between associated adjacent ones of the rows of the first and second air flow paths (36, 37). The manufacturing method includes the coating processes (51, 52), the stacking processes (53, 54), and the drying processes (55, 56). Each of the coating processes (51, 52) is a process of coating each spacing member (32) with the adhesive (34) serving as a suspension that contains "cellulose having a smaller diameter than both of the cellulose forming the partition members (31) and the cellulose forming the spacing members (32)" as an adhesive component. Each of the stacking processes (53, 54) is a process of placing the associated partition member (31) over the spacing member (32) that has been coated with the adhesive (34) in the coating process (51, 52). Each of the drying processes (55, 56) is a process of evaporating the dispersion medium contained in the adhesive (34) of the semi-finished product (61, 62) obtained in the stacking process (53, 54).

In the method for manufacturing the total heat exchange element (30) according to this embodiment, the coating processes (51, 52), the stacking processes (53, 54), and the drying processes (55, 56) are performed. In each of the coating processes (51, 52), the spacing member (32) is coated with the adhesive (34) containing cellulose as the adhesive component. In each of the stacking processes (53, 54), the partition member (31) is placed over the spacing member (32) that has been coated with the adhesive (34). In each of the drying processes (55, 56), the dispersion medium contained in the adhesive (34) evaporates, and the partition member (31) and the spacing member (32) are joined together by cellulose serving as the adhesive component of the adhesive (34).

Variations of Embodiment

The total heat exchange element (30) of this embodiment should not be limited to a cross-flow heat exchanger. The total heat exchange element (30) may be, for example, a counterflow or parallel flow heat exchanger in which the direction of air flowing through the first air flow paths (36) and the direction of air flowing through the second air flow paths (37) are generally parallel to each other.

While the embodiments and variations thereof have been described above, it will be understood that various changes in form and details may be made without departing from the spirit and scope of the claims. The foregoing embodiments and variations thereof may be combined and replaced with each other without deteriorating the intended functions of the present disclosure.

As can be seen from the foregoing description, the present disclosure is useful for a total heat exchange element and a method for manufacturing the same.

The invention claimed is:

1. A total heat exchange element comprising:
   a plurality of partition members made of a material that contains cellulose as a main component, the partition members being configured as flat sheets, and the partition members being stacked with a predetermined distance therebetween;
   a plurality of spacing members made of a material that contains cellulose as a main component, one of the spacing members being disposed between adjacent ones of the stacked plurality of partition members to maintain the distance therebetween; and
   an adhesive portion bonding each one of the plurality of spacing members and the respective adjacent ones of the plurality of partition members together,
   the total heat exchange element having a first air flow path and a second air flow path, the first and second flow paths being alternately formed with one of the plurality of partition members interposed between the first and second air flow paths, and
   the adhesive portion containing, as an adhesive component, cellulose having a smaller diameter than both of
      the cellulose forming the plurality of partition members and
      the cellulose forming the plurality of spacing members, and
   the cellulose as the adhesive component of the adhesive portion including
      cellulose which is hydrogen-bonded directly to the cellulose forming the plurality of partition members and
      cellulose which is hydrogen-bonded directly to the cellulose forming the plurality of spacing members,
   the cellulose of the adhesive portion being hydrogen-bonded directly to the cellulose forming the respective adjacent ones of the plurality of partition members to join each of the adhesive portions to the respective adjacent ones of the plurality of partition members, and
   the cellulose of the adhesive portion being hydrogen-bonded directly to the cellulose forming each one of the plurality of spacing members to join each of the adhesive portions to the respective ones of the plurality of spacing members.

2. The total heat exchange element of claim 1, wherein the cellulose serving as the adhesive component of the adhesive portion has a diameter ranging from 2 nm to 100 nm.

3. The total heat exchange element of claim 2, wherein each of the plurality of spacing members is configured as a corrugated sheet, and
   each of the plurality of spacing members has a greater thickness than each of the plurality of partition members.

4. The total heat exchange element of claim 1, wherein each of the plurality of spacing members is configured as a corrugated sheet, and each of the plurality of spacing members has a greater thickness than each of the plurality of partition members.

5. The total heat exchange element of claim 1 wherein the plurality of partition members and the adhesive portion have moisture permeability.

\* \* \* \* \*